United States Patent [19]

Inagaki et al.

[11] Patent Number: 4,938,550

[45] Date of Patent: Jul. 3, 1990

[54] HOLOGRAPHIC DEFLECTION DEVICE

[75] Inventors: Takefumi Inagaki, Kawasaki; Fumio Yamagishi, Ebina; Hiroyuki Ikeda, Yokohama; Shin-ya Hasegawa, Tokyo, all of Japan

[73] Assignee: Fujitsu Limited, Kanagawa, Japan

[21] Appl. No.: 151,616

[22] Filed: Feb. 2, 1988

[30] Foreign Application Priority Data

Feb. 3, 1987 [JP]  Japan .................................. 62-021892
Nov. 16, 1987 [JP]  Japan .................................. 62-287561

[51] Int. Cl.$^5$ .............................. G03H 1/26; G02B 5/32
[52] U.S. Cl. ................................. 350/3.71; 350/3.7; 350/3.8
[58] Field of Search ................. 350/3.7, 3.71, 3.72, 350/3.73, 3.8

[56] References Cited

U.S. PATENT DOCUMENTS

| | | | |
|---|---|---|---|
| 3,695,744 | 10/1972 | Clay | 350/3.77 |
| 3,903,483 | 9/1975 | Shajenko | 350/3.8 |
| 4,106,844 | 8/1978 | Bryngdahl et al. | 350/3.71 |
| 4,307,929 | 12/1981 | Eveleth | 350/3.71 |
| 4,378,141 | 3/1983 | Yevick | 350/3.61 |
| 4,420,218 | 12/1983 | Rubanov et al. | 350/3.77 |
| 4,637,679 | 1/1987 | Funato | 350/3.71 |
| 4,832,464 | 5/1989 | Kato et al. | 350/3.72 |

FOREIGN PATENT DOCUMENTS

| | | | |
|---|---|---|---|
| 0041845 | 12/1981 | European Pat. Off. | 350/3.71 |
| 58-158678 | 9/1983 | Japan . | |
| 60-66337 | 4/1985 | Japan . | |
| 60-254112 | 12/1985 | Japan | 350/3.71 |
| 61-48813 | 3/1986 | Japan | 350/3.71 |
| 61-134727 | 6/1986 | Japan . | |
| 61-134728 | 6/1986 | Japan . | |
| 8607640 | 12/1986 | PCT Int'l Appl. | 350/3.71 |

*Primary Examiner*—Bruce Y. Arnold
*Assistant Examiner*—Terry S. Callaghan
*Attorney, Agent, or Firm*—Staas & Halsey

[57] ABSTRACT

A holographic deflection device having a tunable laser, and at least one hologram for deflecting light incident thereupon from the tunable laser, so that the deflection of the light can be controlled by a change of the wavelength of the beam from the tunable laser.

37 Claims, 11 Drawing Sheets 4,938,550

HOLOGRAPHIC DEFLECTION DEVICE

BACKGROUND OF THE INVENTION

1. Field of the Invention

The present invention relates to an optical deflection device. More precisely, it relates to a holographic deflection device by which the deflection angle can be controlled only by controlling the wavelength of the light beam source and in which it is not necessary to move the lens.

2. Description of the Related Art

In conventional optical deflection devices, the deflection angle is usually controlled by a mechanical displacement of a rotating polygon mirror or an oscillating mirror by a motor. It is also known to use a hologram scanner in which a hologram is mechanically moved.

In these types of known optical deflection devices having mechanically movable portions, the devices are relatively large, lubrication of the movable portions is necessary, and unavoidable wear of the movable portions occurs. Also, the precision of the control of the deflection angle depends on the limited mechanical precision of the mechanical movable portions. The scanning speed is limited by the mechanical movement.

Also known is an optical deflector which incorporates a solid element, such as an acoustooptic element, but this optical deflector can realize only a small deflection angle and thus has only a limited use.

In view of the above, and contrary to the usual practice of the prior art in which it is considered that the deflection angle can be controlled only by a mechanical displacement of a lens or a mirror, the inventors of the present invention decided to investigate a non-mechanical control of the deflection angle.

Namely, the primary object of the present invention is to provide an optical deflection device by which the deflection angle can be optically controlled without moving the lens or mirror.

SUMMARY OF THE INVENTION

To achieve the object mentioned above, according to the present invention, there is provided an optical deflection device which comprises a tunable semiconductor laser, in which the wavelength of the beam emitted therefrom can be varied, and at least one hologram lens which is inclined from the optical axis at a predetermined angle, whereby the deflection angle can be controlled by changing the wavelength of the laser beam incident upon the hologram.

With this arrangement, the diffraction grating can be changed by only a change in the wavelength of the laser beam, resulting in an easy control of the deflection angle of the laser beam by the hologram.

BRIEF DESCRIPTION OF THE DRAWINGS

The invention will be described below in detail with reference to the accompanying drawings, in which.

DESCRIPTION OF THE PREFERRED EMBODIMENTS

Figure 1:
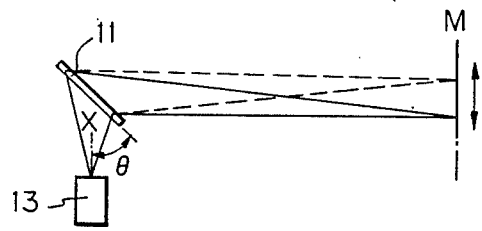
FIG. 1 is a schematic view showing a principle of an optical system according to the present invention.

In FIG. 1, which shows a basic principle of the deflection device according to the present invention, the device essentially comprises a hologram lens 11 having a focal length depending on the wavelength of the beam transmitted therethrough, and a tunable laser 13. The hologram lens 11, as is well known, converges light by a diffraction effect and this function is largely dependent upon the wavelength of the beam. The hologram lens 11 is inclined from the optical axis X of the tunable laser 13 at a predetermined angle $\theta$, so that when the wavelength of the laser beam incident upon the hologram lens 11 varies, the deflection angle of the hologram lens 11 also varies, as shown by an imaginary line. Consequently, the focal point on an image plane M is scanned in the directions shown by arrows in FIG. 1. The present invention utilizes this characteristic of the hologram lens to realize a laser scanner which can scan the laser beam only by controlling the wavelength of the laser beam and without a mechanical displacement of the hologram lens 11. Note that when the present invention is applied to a deflection device unable to carry out beam scanning, the hologram lens 11 can be replaced by a common plane hologram having plane relief type gratings and not able to converge light.

It should be noted that the focal length of the hologram changes slightly, in addition to the change of the deflection angle, when the wavelength of the laser beam is changed, as is well known, and accordingly, this should be taken into consideration when the position of the image plane M is determined.

Supposing that the spatial frequency (1/pitch of the gratings) of a diffraction hologram is f and the wavelength is $\lambda$, then the following equation stands, as is well known:

$$\sin \theta_2 + \sin \theta_1 = f \cdot \lambda$$

wherein, $\theta_1$ = incident angle, $\theta_2$ = exit (deflection) angle.

Accordingly, for example, if f=1813/mm, $\theta_1 = \theta_2$ =45°, $\lambda$=780 nm, the change $\Delta\lambda$ of $\lambda$ by $\Delta\lambda$=2 nm, and $\Delta\lambda$=20 nm causes 0.29° and 3.00° changes in the deflection angle, respectively. In this case, when the distance between the hologram and the image plane M is 1000 mm, the scanning width is 5.1-52.0 mm.

The deflection angle can be determined by the angle $\theta$ by which the hologram lens 11 is inclined from the optical axis of the laser beam source 13, and in practice, it may not be possible to obtain a desired deflection angle by a single hologram lens. Therefore, it is possible to provide a plane hologram (not hologram lens) 15, in an angled (angular spiral) arrangement, as shown in FIG. 2, so that the deflection angle can be integrated when light is transmitted through the plane hologram 15.

In the illustrated embodiment, the plane hologram 15 is inclined at approximately 45° with respect to the beam incident thereupon, so that when a laser beam having a predetermined wavelength is passed through the plane hologram 15, the laser beam is deflected by approximately 90°. It should be noted that the angular displacement of the laser beam can be optionally determined in accordance with the position of the image plane M and the number of plane holograms 15.

Figure 2:
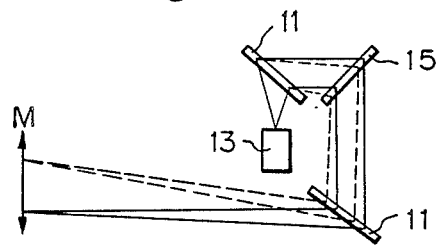
FIG. 2 is a schematic view showing a modified optical system according to the present invention.

The arrangement shown in FIG. 2 is directed to a realization of a hologram scanner similar to FIG. 1. In the arrangement shown in FIG. 2, the first and final holograms are formed as hologram lenses 11 to converge the light at a point (focal point) on the image plane M. However, if a convergence of the light is not necessary, the final hologram lens 11 can be replaced with a plane hologram 15.

It will be also easily understood that the final hologram lens 11 can be replaced with a common optical lens, such as a glass lens, if the lens is needed only to converge the light, i.e., only to focus the beam without controlling the deflection angle in accordance with a change of the wavelength of the beam.

Generally speaking, the scanning range (width) for a hologram scanner increases in proportion to the increase of the number of plane holograms 15 and hologram lenses 11. Theoretically, the deflection angle and the scanning width are increased N times when the number of hologram stages is N.

Although there are various known tunable lasers 13 which can be used in the present invention, a tunable semiconductor laser is preferably used in the illustrated embodiment.

Figure 3:
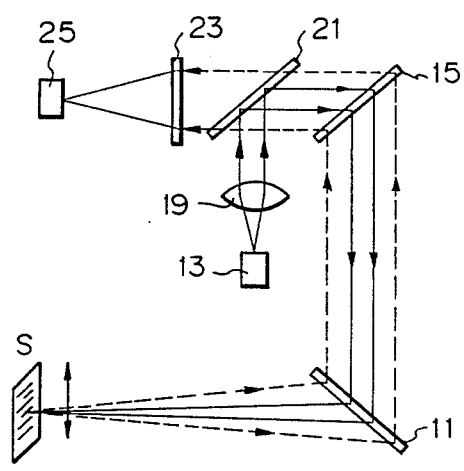
FIG. 3 is a schematic view showing another optical system according to the present invention.

FIG. 3 shows another embodiment of the present invention, in which the deflection device is applied to a device for reading optical information, such as a bar-code reader (pen reader). In FIG. 3, the light emitted from the tunable semiconductor laser 13 is collimated by a collimating lens 19 into parallel light and then reflected at 90° to the right in FIG. 3 by a half mirror 21 which is inclined at an angle of 45° from the optical axis of the laser 13. The reflected light is then deflected by the plane hologram 15 which is inclined at an angle of 45° with respect to the reflected light, and then converged onto an information medium (e.g. bar-code) S by the hologram lens 11. The light reflected by the information medium S is deflected again by the hologram lens 11 and the plane hologram 15, is transmitted through the half mirror 21, and is focussed on an optical detector 25 by a collecting lens 23. In this arrangement, when the wavelength of the laser beam is changed by the tunable laser 13, the light emitted from the hologram lens 11 is scanned to read the bar-code on the medium S, as mentioned above. In this embodiment, the change of the wavelength enables the beam to be non-mechanically scanned, and the combination of this deflection device of the present invention with an optical detector enables a bar-code reader to be easily realized.

Figure 4:
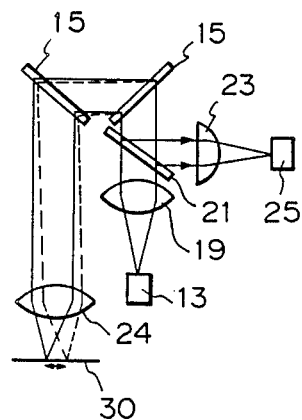
FIG. 4 is a schematic view showing still another optical system according to the present invention.

FIG. 4 shows an embodiment in which the deflection device of the present invention is applied to a tracking servo-system for an optical head of an optical disc apparatus. The basic construction of the arrangement shown in FIG. 4 is similar to that shown in FIG. 3 and, accordingly, the elements shown in FIG. 4 corresponding to those in FIG. 3 are denoted by the same numerals. Note that the collecting lens 24 is adapted to scan the light on the optical disc 30, and the information on the optical disc 30 is detected by the optical detector 25. In FIG. 4, two plane holograms 15 are utilized.

It should be noted that an achromatic lens can be located behind the plane hologram or hologram lens(es) to correct any chromatic abberation occurring due to the associated hologram or hologram lens.

Figure 5:
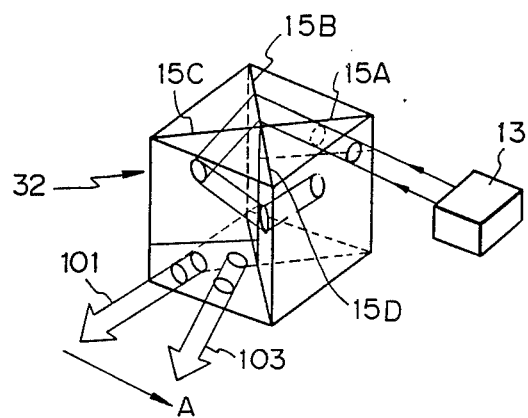
FIG. 5 is a schematic perspective view of a holographic deflecting device according to the present invention.
Figure 6:
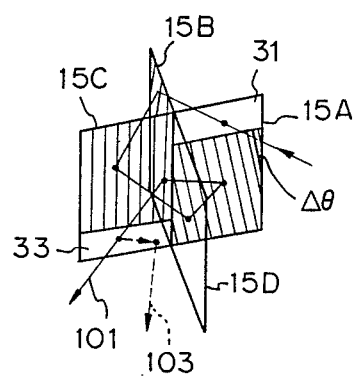
FIG. 6 is a schematic view showing an optical principle of the holographic deflecting device shown in FIG. 5.
Figure 7:
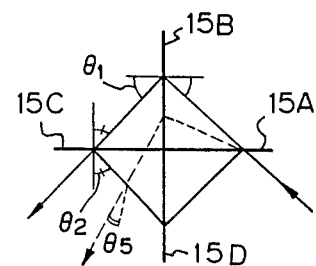
FIG. 7 is a schematic plan view showing the deflection of light rays in a holographic deflecting device shown in FIG. 6.

FIGS. 5 to 7 show an embodiment of a compact hologram module or hologram unit forming a deflection device according to the present invention, in which a desired number of holograms are integrally incorporated in a transparent polygonal body in the following special arrangement.

As shown in FIG. 5, four plane diffraction holograms 15A–15D are located in a parallelepiped glass body 32 in a diagonal arrangement. When the laser beam emitted from the tunable laser 13 is incident at a slant from above upon the glass body 32 at a predetermined angle, the light is successively diffracted downward by the holograms 15A to 15D substantially along an angle spiral path (having one and a half turns in the illustrated embodiment) and finally emitted outward from the final hologram (hologram 15B in the illustrated embodiment). In this arrangement, when the wavelength of the laser beam is varied by the tunable laser 13, the light emitted from the hologram module can be scanned from point 101 to point 103 in the direction A shown in FIG. 5.

This will be described below in more detail with reference to FIGS. 6 and 7.

In FIG. 6, which shows only the plane holograms 15A–15D perpendicular to each other, one of the holograms, i.e., the first hologram upon which the light is incident from the tunable laser 13, i.e., the hologram 15A, has a non-hologram portion 31 in which a hologram is not formed. This will be referred to as a beam incident portion 31. Similarly, the hologram from which the deflected light is emitted, e.g., the hologram 15C, has a non-hologram portion 33 in which a hologram is not formed. This will also be referred to as a beam emitting portion 33. Preferably, the beam incident portion 31 is formed in an upper edge portion of the hologram 15A and the beam emitting portion 33 is formed in a lower edge portion of the hologram 15C.

The light incident upon the beam incident portion 31 (non-hologram portion) of the hologram 15A at a slant from above and toward the second hologram 15B through the beam incident portion 31 is first diffracted by second hologram 15B toward the third hologram 15C at a diffraction angle $\theta_1$. The light is then diffracted by the third hologram 15C toward the fourth hologram 15D at a diffraction angle $\theta_2$. This diffraction is repeated. The light is sent downward substantially along the angled spiral path every time the diffraction occurs. In the illustrated embodiment, the light is emitted outward from the beam emitting portion 33 (non-hologram portion) of the third hologram 15C after the light has passed through about one and a half turns of the angled spiral. The change of the wavelength of the laser beam incident upon the incident portion 31 of the first hologram 15A causes the change in the deflection angle of the plane holograms, to enable a scan of the emitted rays between points 101 and 103.

Alternatively, instead of the beam being incident upon the incident portion at a slant from above, it is also possible to incline the diffraction grating of at least one hologram, e.g., the hologram 15A, at a predetermined inclination angle $\Delta\theta$, from the axis of symmetry (center axis of the four holograms), as shown in FIG. 6. The inclined gratings cause the light perpendicularly incident upon the side face of the parallelepiped glass body 32 to be diffracted downward. The above alternative, in which the hologram has an inclined diffraction grating, can be applied to any hologram, but preferably is applied to the hologram which first diffracts the incident beam, i.e., the hologram 15B, in the illustrated embodiment. Note that, in FIG. 6, although the hologram 15A is shown with inclined diffraction gratings, this is only for clarification, since the inclination of the diffraction gratings can be seen clearest in the hologram 15A rather than the hologram 15B.

Figure 8:
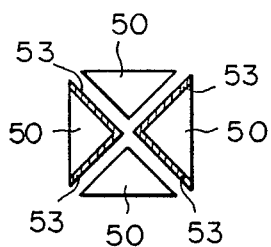
FIG. 8 is a schematic plan view of a hologram module by which a holographic deflecting device according to the present invention is realized.
Figure 9:
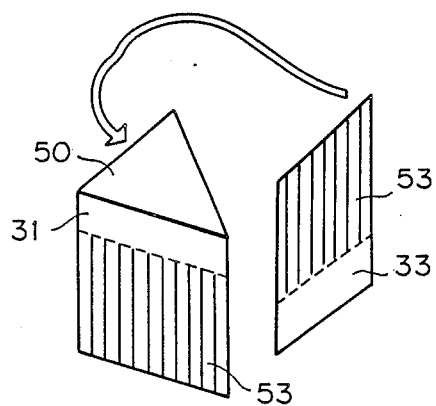
FIG. 9 is a schematic perspective view of one rectangular prism shown in FIG. 8.

FIGS. 8 and 9 show a concrete example of the construction of the hologram module shown in FIGS. 5 to 7.

In FIG. 8, the hologram module has four rectangular prisms 50 having a height of 20 mm and a side length of 10 mm, and having a right-angle triangular cross section. Two of the prisms 50 have hologram material applied to the adjacent side faces defining a right angle. The hologram material can be, for example, PVCz (polyvinyl carbazole), but is not limited thereto. The hologram material is subject to a holographic exposure to form a diffraction grating 53 f=2738/mm. The holographic exposure is carried out, for example, by the interference (interference having an equal angle of 26.4°) of two beams from an He-Cd laser ($\lambda=325$ nm) or by the interference (interference having an equal angle of 37.2°) of an He-Cd laser having $\lambda=441.6$ nm. One of the two rectangular prisms having the diffraction grating (holograms) 53 has non-hologram portions having a width of 5 mm in the height direction on an upper edge portion of one side face and on a lower edge portion of the other side face, to provide the incident portion 31 and the emitting portion 33 (FIG. 9).

The two rectangular prisms having holograms formed thereon and opposed to each other, and the remaining two rectangular prisms 50 having no hologram formed thereon and opposed to each other, are bonded together by an adhesive to form a parallelepiped hologram module (assembly) in which the latter two prisms 50 having no hologram are located between the first two prisms 50 having holograms, so that the assembly has a hologram (grating) 53 located in a diagonal arrangement in the parallelepiped transparent body.

Figure 10:
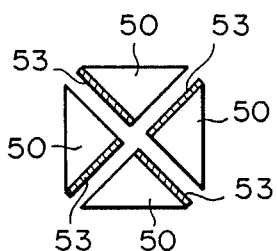
FIG. 10 is a schematic plan view of a modified hologram module according to the present invention.
Figure 11:
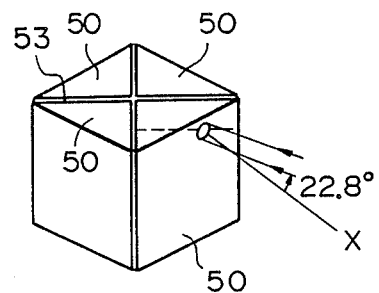
FIG. 11 is a schematic perspective view of a hologram module showing how light is incident thereupon.

FIG. 10 shows a modified embodiment of FIG. 8.

In FIG. 10, each of the rectangular prisms 50 has one hologram (grating) 53 on one of the side faces defining a right angle. Namely, in the modification shown in FIG. 10, four identical rectangular prisms 50 having the holograms 53 are bonded together, similar to FIG. 8, to realize a hologram module equivalent to the hologram shown in FIG. 8.

Laser beams 4 mm in diameter are incident upon the hologram module shown in FIG. 8. The laser beam source is, for example, a tunable semiconductor laser by which the wavelength of 780 nm can be varied within the range of ±5 nm. When the collimated light is incident upon the incident portion (non-hologram portion) 31 of the rectangular prism 50 at an incident angle of, for example, 22.8° with respect to an axis X normal to the side face of the associated prism 50, the incident light is refracted by the glass surface (refractive index = 1.51) of the prism 50, so that the refracted light is orientated in the direction of 14.9° in the glass.

The light in the glass is diffracted by the first hologram 53. Generally speaking, the diffraction angle $\theta_m$ of the light by the m'th (m-order) hologram is given by the following equation:

$$\sin\theta_m = f(\lambda/n) - \cos\theta_{m-1} \qquad \text{①}$$

wherein n is a refractive index.

When the diffraction angle is varied by $\Delta\theta_m'$ due to the change $\Delta\lambda$ of the wavelength, and if it is supposed that $\theta_m = \pi/4 + \Delta\theta_m'$, the equation ① can be approximately represented by the following equation:

$$\Delta\theta_m' = \Delta\theta_{m-1}' + 2\cdot\frac{\Delta\lambda}{\lambda} \qquad \text{②}$$

wherein $$f(\lambda/n) = \sqrt{2}$$

From this, the change of the diffraction angle by a diffraction of N times can be represented by:

$$\Delta\theta_m' = 2N\Delta\lambda/\lambda \qquad (3)$$

Finally, the exit angle $\theta$ of the light emitted from the emitting portion 33 of the hologram module is given the following equation, in accordance with Snell's law:

$$\theta = \sin^{-1}(n \sin \Delta\theta_m') \qquad (4)$$

For example, when the light is diffracted eight times, the following equation is obtained from equations (3) and (4):

$$66 \; \theta_8' = 5.9°$$

$$74 = 8.9°$$

wherein $\Delta\lambda = 5$ nm, $\lambda = 780$ nm.

Figure 12:
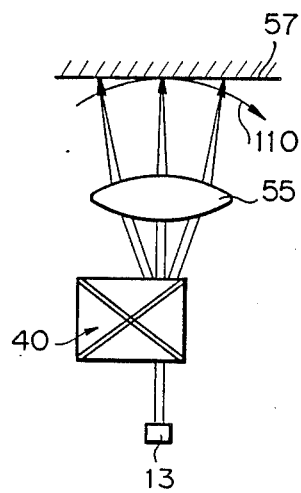
FIG. 12 is a schematic plan view of a holographic deflecting device according to the present invention, which is applied to a laser printer.

FIG. 12 shows the application of the device of the invention to a known laser printer. In this application, the beam emitted from the tunable semiconductor laser 13 is scanned along a straight line (scanning line) on a photosensitive recording drum 57 of the laser printer by the hologram module 40 of the present invention, as mentioned above, through a known f$\theta$ lens 55 for focussing the scanning beam, which otherwise would be scanned in an arc as shown at 110 in FIG. 12, onto a plane. The subject of the present invention is not directed to the laser printer itself, and accordingly, a detailed explanation of the construction of the laser printer will not be given herein. In the arrangement shown in FIG. 12, to obtain the diffraction angle of $\theta = 60°$, the following equation is obtained from equations (3) and (4):

$$\Delta\theta_m' \approx 19.3° = 0.34 \text{ rad}$$

Therefore, $$2N\Delta\lambda/\lambda = 0.34.$$

If it is supposed that $\lambda = 780$ nm, then
$\Delta\lambda = 16$ nm when $N = 8$,
$\Delta\lambda = 11$ nm when $N = 12$, and
$\Delta\lambda = 8.2$ nm when $N = 16$.

It is confirmed that, although an increase of N leads to a decreased efficiency ($\eta$) in the use of the light, $\eta$ is more than 66% when $N = 8$, since each of the holograms has a high efficiency of light usage of more than 95%.

Figure 13:
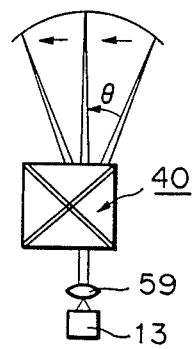
FIG. 13 shows a modification of FIG. 12.

FIG. 13 shows another embodiment, in which the laser beam light emitted from the tunable semiconductor laser is collimated by a collimating lens 59, so that parallel beams of light are incident upon the hologram module 40. The f$\theta$ lens is not provided in this embodiment. In this embodiment, the beam is actually scanned in an arc, as mentioned before. It is also possible to provide an additional hologram in order to correct the focussing points along the arc, to scan the beam in a straight line. In the arrangement shown in FIG. 13, the last hologram of the hologram module corrects the beam.

Figure 14:
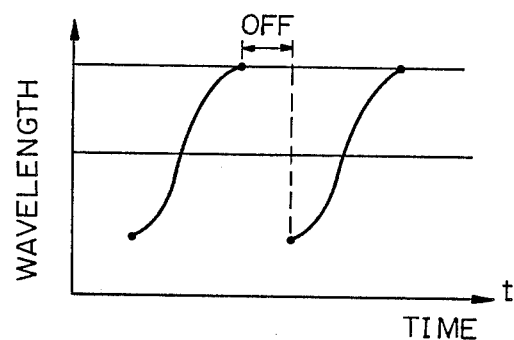
FIG. 14 is a diagram showing a wavelength sweep necessary to realize a constant speed scanning.

In FIG. 12, it is also possible to provide a difference in the variation of the wavelength per unit time, as shown in FIG. 14, i.e., to carry out a timed control of the sweep of the wavelength and thus realize scanning at the same speed.

The invention can be also applied to a bar-code reader or an optical head, etc.

Figure 15:
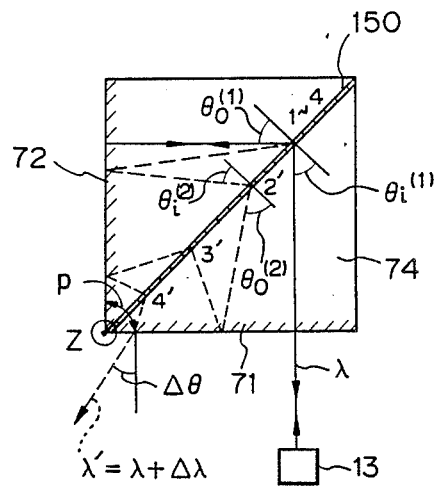
FIG. 15 is a schematic view of a hologram module according to the present invention, in which a hologram is located between two reflecting surfaces.
Figure 16:
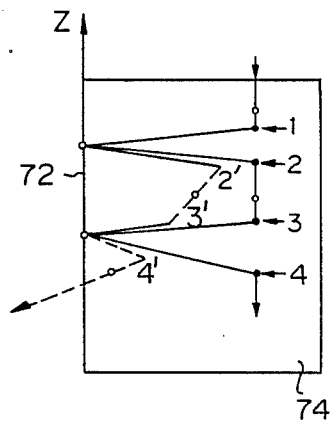
FIG. 16 is a schematic view of light tracks viewed from a second reflecting surface of the hologram module shown in FIG. 15.
Figure 17:
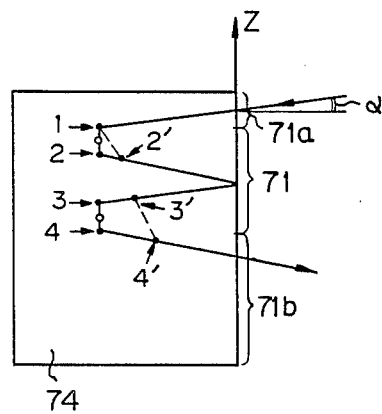
FIG. 17 is a schematic view of light tracks viewed from a first reflecting surface of the hologram module shown in FIG. 15.

FIGS. 15 to 17 show another embodiment of the present invention, in which a combination of a transmission hologram and reflecting mirrors is used to realize a hologram module of the invention.

In FIG. 15, the module essentially has two reflecting surfaces 71, 72 and a transmission hologram 150 located between the reflecting surfaces 71, 72. In the illustrated embodiment, the reflecting surfaces 71 and 72 are embodied by reflecting mirrors formed on adjacent side faces of a rectangular optical glass 74, so that the light entering the hologram module is reflected by the reflecting surfaces. Also, in the illustrated embodiment, the reflecting surface 71 has partial non-reflecting portions 71a and 71b, through which the light is transmitted, so that the incident light can pass through the non-reflecting portion 71a into the hologram module and the outgoing light can be emitted therefrom through the non-reflecting portion 71b, which is located lower than the non-reflecting portion 71a, as shown in FIG. 15.

The reflecting surfaces 71 and 72 intersect each other at a predetermined angle P (e.g. 90°), at an intersecting axis (z-axis). Preferably, the plate-like hologram 150 is extended so that it intersects the z-axis. Also preferably, the hologram 150 has plane gratings with grating grooves parallel to the z-axis. The parallel arrangement of the grating grooves to the z-axis is not always necessary.

The optical glass 74, which is an optical media, is formed, for example, by BK7. In theory, the optical medium can be air. In this case, the reflecting surfaces 71 and 72 can be formed on respective plate-like reflecting mirrors which intersect each other at a predetermined angle P.

The laser beam (wavelength $\lambda$) is incident upon the hologram module through the non-reflecting portion 71a of the reflecting surface 71 from the tunable laser 13, preferably at an incident angle of $\alpha$ with respect to the surface plane thereof, as shown in FIG. 17. The incident light is preferably parallel but can be convergent.

The incident light enters the optical medium (optical glass 74) through the non-reflecting portion 71a without being reflected. The light reaches the hologram 150 and is diffracted thereby toward the reflecting surface 72. The light is then reflected again by the reflecting surface 72 toward the hologram 150, so that the light is diffracted by the hologram 150 toward the reflecting surface 71. The reflection by the reflecting surfaces 71 and 72 and the diffraction by the hologram 150 are repeated, and finally, the light is emitted from the hologram module through the nonreflecting portion 71b.

In FIGS. 15 to 17, the solid line shows one example of the beam track and the points represented by 1, 2, 3 and 4 are points on the hologram 150 at which the light is diffracted. The points at which the light is diffracted by the hologram 150 are successively moved downward in the order of 1, 2, 3 and 4, as shown in FIG. 17.

The imaginary line in FIGS. 15 to 17 shows one example of a beam track when the wavelength of the laser beam is changed from $\lambda$ to $\lambda' = \lambda + \Delta\lambda$. When the wavelength is increased by $\Delta\lambda$, the diffraction angle is increased accordingly, and thus the diffraction angle is successively increased every time the light is diffracted by the hologram. The points represented by 1', 2', 3' and 4' are points on the hologram 150 at which the light having a wavelength of $\lambda'$ is diffracted. The light is finally emitted through the non-reflecting portion 71b from the hologram module. It should be recalled that the angle and the position of the light emitted from the hologram module through the non-reflecting portion 71b vary in accordance with the change of the wavelength of the beam, as mentioned above, so that the light can be scanned by a control of the wavelength of the incident beam.

The following is an example of the design of the hologram module shown in FIGS. 15 to 17.

The optical glass 74, which is made of BK7 (refractive index n=1.51), has a square section 20 mm ×20 mm and a plane grating 150 which is inclined at 45° with respect to the reflecting surfaces 71 and 72 formed on the two adjacent side faces of the optical glass 74. The hologram 150 is embedded in the glass body (optical glass). The plane grating of the hologram is formed by the holographic interference of two fluxes of the beam from an Ar laser ($\lambda$=488 nm) at the same incident angle of ±41.9°. The hologram is preferably a phase hologram and the material of the hologram can be polyvinyl carbazol or gelatin dichromate, etc. The reflecting surface 71 has non-reflecting portions corresponding to the incident portion 71a and outgoing portion 71b in the direction perpendicular to the z-axis. The reflectivity of the reflecting surfaces is more than 99%, which is realized by forming multilayers of film on the reflecting surfaces.

The collimated light (beam diameter: about 0.8 mm) from the tunable laser 13 is incident upon the side face of the glass body through the non-reflecting portion (incident portion) 71a at an incident angle of about 2° ($\alpha$=2°) substantially in parallel with the reflecting surface 72. The angle of the light entering the glass body is changed from $\alpha$ to $\alpha'$, which can be obtained from the following Snell's law:

$$\alpha' = \sin^{-1}(n\sin\alpha) \approx 1.32°$$

wherein n=refractive index of the glass body =1.51

(i) First, the wavelength of the laser beams is set at $\lambda$ (=780 nm). The incident light is incident upon point 1 of the hologram 150, at an incident angle of $\theta_i^{(1)}$(=45°), when projected in a plan view (FIG. 15). The outgoing angle $\theta_o^{(1)}$ of the light diffracted by the hologram 150 at the point 1 is given by the following equation:

$$\sin\theta_o^{(1)} = f\lambda/n - \sin\theta_i^{(1)} = 45°$$

Then, the light is reflected by the reflecting surface 72 and reaches point 2 of the hologram 150, where the light is similarly diffracted by the hologram 150.

The foregoing operations are repeated, so that the light is successively moved downward. If the diffraction by the hologram takes place twice, the light is moved downward by 40 nm×tan $\alpha'$=0.92 mm, and if the diffraction takes place ten times, the downward displacement of the light is about 4.61 mm. Accordingly, in the latter case, if the non-reflecting portion 71b is provided in an area which extends downward from a point below the incident portion 71a by about 4.61 mm, the light can be emitted from the hologram module through the non-reflecting portion 71b.

(ii) Subsequently, the wavelength of the laser beam is changed to $\lambda'$ (=785 nm). Also, in this case, the light is incident upon point 1 of the hologram 150 at an incident angle of 45°. The diffraction angle ($\sin\theta'_o^{(1)}$) at point 1 of the hologram 150 is as follows:

$$\sin\theta'_o^{(1)} = f\lambda'/n - \sin\theta_i^{(1)}$$

From $\lambda' = \lambda + \Delta\lambda$ is obtained:

$$\theta'_o^{(1)} \approx 45.75°$$

Accordingly, the light is incident upon and reflected by the reflecting surface 72 at an angle of about 0.74°. The reflected light is incident upon point 2' at an incident angle of $\theta_i^{(2)}$=45°−0.74°=44.26°.

Generally speaking, in the hologram module of the present invention, the light incident upon the hologram at an incident angle of $\theta_o$ is incident again upon the hologram at an incident angle of $\sin^{-1}(\cos\Gamma_o)$ after reflection by the associated reflecting surface. In the repetition of the diffraction by the hologram, the change in the angle of the hologram causes a reduction of the incident angle of the subsequent incidence of the light upon the hologram, and accordingly, an increase of the diffraction angle. This results in a synergetic effect of a change of the angle by the hologram and the reduction of the incident angle, resulting in a large change in angle.

Figure 18:
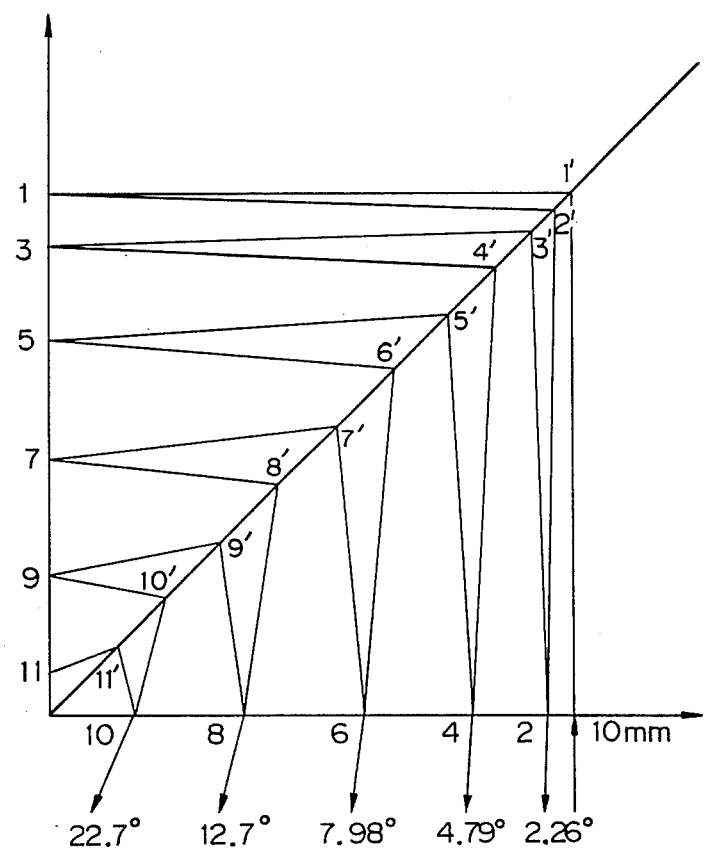
FIG. 18 is a diagram showing light tracks, obtained by calculations, in a hologram module shown in FIG. 15.

FIG. 18 shows one example of a beam track, which can be mathematically obtained, in the present invention. The light is subject to repeated diffraction and reflection to cause the change in the outgoing angle and the position thereof.

Note that the numbers of the diffraction points (1',2', ... 11') and the reflection points (1,2, ... 10) in FIG. 18 do not correspond to those in FIGS. 16 and 17.

Figure 19:
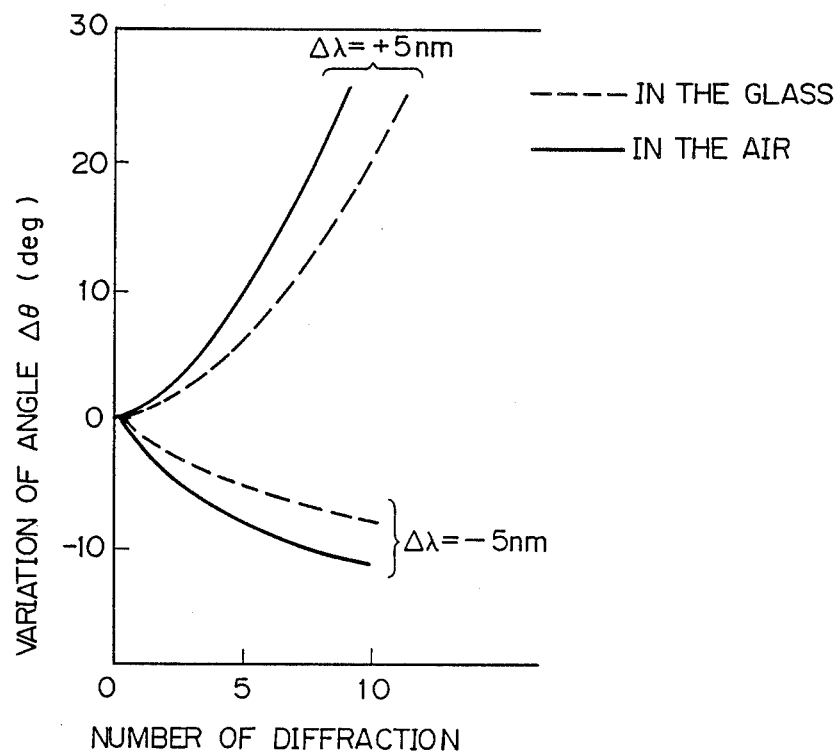
FIG. 19 is a diagram showing a relationship between a variation of angle and the number of diffraction by a hologram according to the present invention.

FIG. 19 shows a relationship between the number of diffractions by the hologram and the change in angle when the wavelength varies by +5 nm and −5 nm, respectively. The change in angle referred to means a difference in angle occurring when the wavelength changes and when the wavelength does not change. Two change curves are shown in FIG. 19, one for in the air and the other for in the glass.

For, example, when the diffraction takes place ten times, the change of +5 nm in the wavelength causes a change of 22.7° in angle in the air, and the change of −5 nm in wavelength causes a change of −7.98° in angle. If eleven diffractions occur, the light is then emitted from the hologram module through a non-reflecting portion which is provided on the reflecting surface 72, similar to the non-reflecting portion 71b of the reflecting surface 71, and the change in angle ($\Delta\theta$) is 34.0°.

Figure 20:
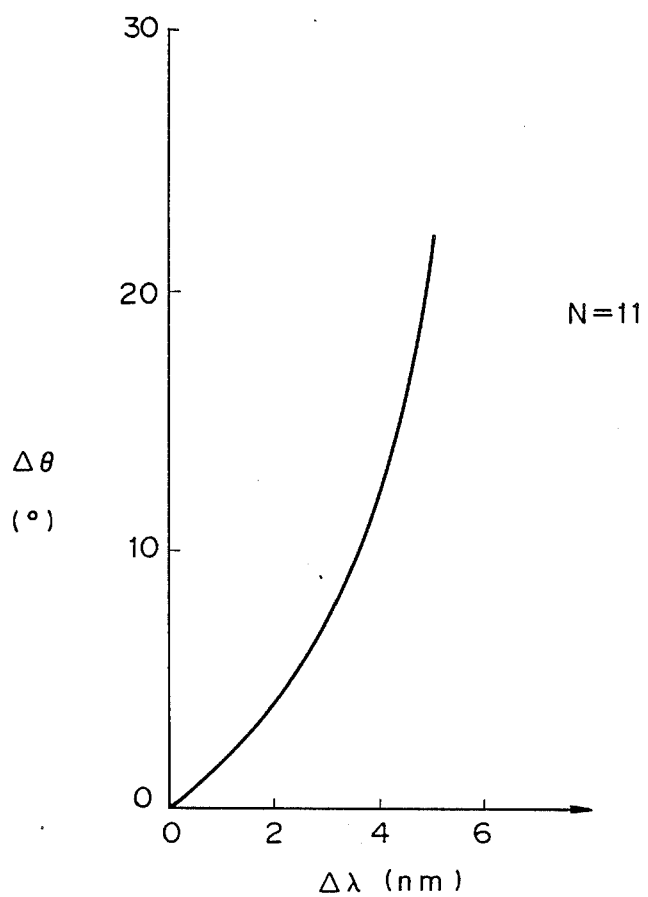
FIG. 20 is a diagram showing a relationship between a variation of angle and a variation of wavelength.

FIG. 20 shows a relationship between the change in angle ($\Delta\theta$) and the change of wavelength ($\Delta\theta$) in the case of eleven diffractions (number N of the diffraction is 11). Note that the change of −5 nm in wavelength causes a −8.3° change in angle. Therefore, a ±5 nm change in wavelength can produce an about 42° change in angle. This change in angle is sufficient for the application of the hologram module of the present invention, for example, to a laser printer.

The efficiency $\eta$ of light usage is given by the following equation, provided that the efficiency of the hologram is 95% and the reflectivity of the reflecting surfaces is 99%.

$$\eta = 0.99^{10} \times 0.95^{11} = 0.51$$

When the present invention is applied to a laser printer, a beam focussing function and a constant speed scanning function are required. The beam focussing can be achieved by a known additional optical system, such as an optical head in an optical disc apparatus which has a beam converging function and which can be provided at a portion of the hologram module from which the light is emitted, e.g., at the non-reflecting portion 71b. The constant speed beam scanning can be achieved by control of the electric current of the tunable laser which controls the change of th wavelength in relation to time, as mentioned above with reference to FIG. 14.

Figure 21:
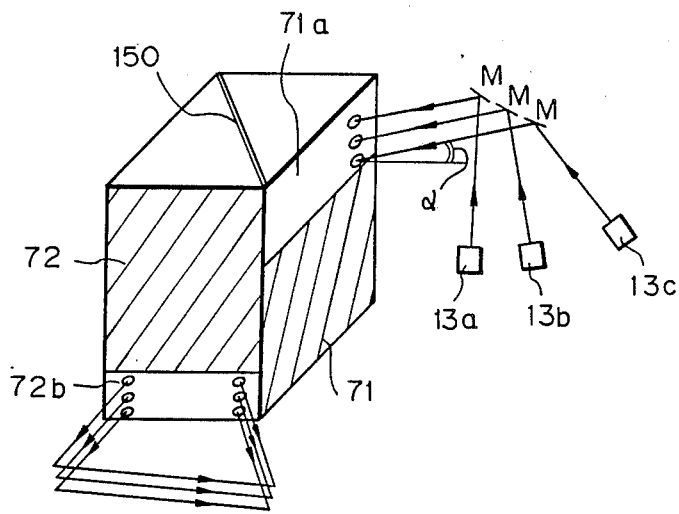
FIG. 21 is a schematic perspective view of a hologram module in which a plurality of beams are incident thereupon.
Figure 22:
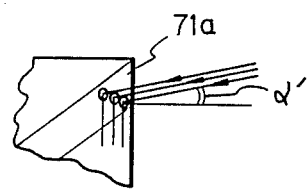
FIG. 22 shows a modification of FIG. 21.

FIGS. 21 and 22 show another application of the present invention, in which more than two tunable lasers (three tunable lasers 13a, 13b, and 13c are shown in the illustrated embodiment) are provided to realize a multi-beam scanner. Namely, the beams are emitted from three separate tunable lasers and are reflected by respective additional mirrors M toward the non-reflecting portion (incident portion) 71a of the reflecting surface 71. The incident angles of the three beams can be either identical to or different from each other. In the arrangement shown in FIG. 21, the outgoing portion, i.e. the exit non-reflecting portion 72b, is formed on the reflecting surface 72 rather than on the reflecting surface 71.

In FIG. 22, the three beams are incident upon the incident portion 71a at an incident angle $\alpha'$ with respect to a line normal to the incident surface, along an oblique line, unlike FIG. 21 in which the three beams are incident upon a vertical line.

The beam deflection is non-mechanically effected. In theory, it is possible to scan the beam at a high speed up to a limit of the response to the wavelength of the laser, which is at least one thousand times the scanning speed (about 300 m/sec at the most) of the mechanical scanning of the existing polygon mirror.

Figure 23:
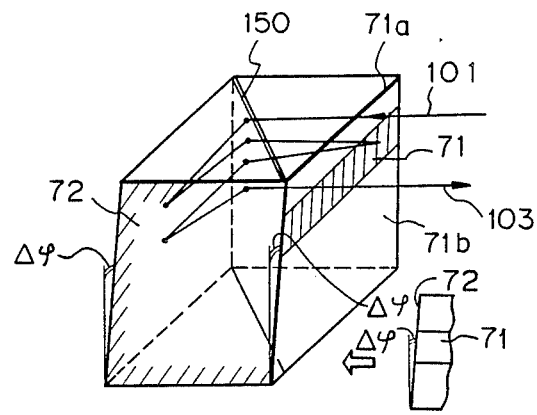
FIG. 23 is a schematic perspective view of another hologram module according to the present invention.
Figure 24:
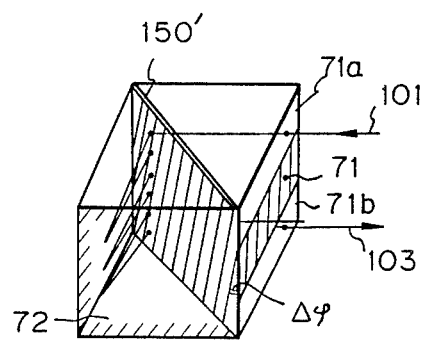
FIG. 24 is a schematic perspective view of still another hologram module according to the present invention.

FIGS. 23 and 24 show modified embodiments of FIGS. 21 and 22. In FIG. 23, the reflecting surface 72 is inclined by $\Delta\phi$ with respect to a vertical plane, which is perpendicular to a vertical plane including the reflecting surface 71. With this arrangement, it is possible to make the light incident upon the incident portion (non-reflecting portion) 71a normal thereto (i.e. $\alpha$ or $\alpha'=0°$), since the light incident upon the incident portion 71a is diffracted by the hologram 150 toward the reflecting surface 72 which reflects the diffracted light downward at an angle determined by the inclination angle $\Delta\phi$ of the reflecting surface 72, so that the light is finally emitted from the hologram module through the non-reflecting portion 72 formed on the side face thereof, similar to the arrangement shown in FIGS. 21 and 22.

In FIG. 24, the diffraction grating of the hologram 150' is inclined at an angle $\Delta\phi$ with respect to the vertical, instead of the inclination of the reflecting surface 72 as shown in FIG. 23. The arrangement shown in FIG. 24 is functionally equivalent to the arrangement shown in FIG. 23. Namely, even if the light is incident upon the incident portion 71a perpendicularly thereto, the light can be emitted from the hologram module through the lower non-reflecting portion 71b formed on the side face including the reflecting surface 71 or 72.

With the arrangements illustrated in FIGS. 23 and 24, since the light can be incident upon the incident portion 71a perpendicularly thereto, an easier optical arrangement of the incident light can be expected.

In FIGS. 21 to 24, numerals 101 and 103 designate incident light and outgoing light, respectively.

FIGS. 25A, 25B, 26, and 27 show three modified embodiments in which the most significant feature resides in the use of a reflection hologram instead of the transmission hologram in the above-mentioned embodiments.

Figure 25A:
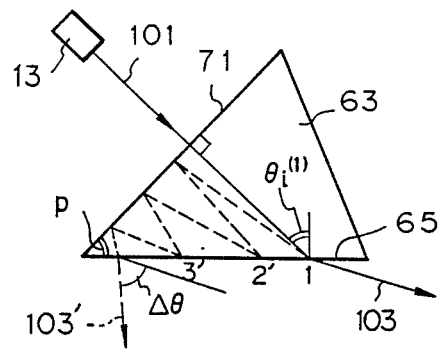
FIGS. 25A and 25B are a schematic plan view and a front elevational view, respectively, of another hologram module.
Figure 25B:
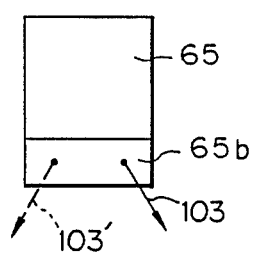

In FIGS. 25A and 25B, a hologram module has a glass body 63 with a triangular section which is provided, on adjacent side faces defining an angle P which is less than 90° in the illustrated embodiment, with a reflecting surface 71 and a reflection hologram 65. Alternatively, it is also possible to provide separate plates having the reflecting surface 71 and the reflection hologram 65, respectively, so that the plates intersect each other at an angle P, without the glass body 63. In this alternative, the optical medium is air, not glass.

The side face of the hologram module including the reflecting surface 71 has a partial non-reflecting portion 71a (FIGS. 21, 23, 24, etc.) upon which the light 101 is incident.

Similarly, the side face including the reflection hologram 65 has a partial non-hologram portion 65b through which the light 103 or 103' is finally emitted, as shown in FIG. 25B.

The light 101 incident upon the non-reflecting portion (incident portion) from the tunable laser 13 is diffracted by the reflection hologram 65 toward the reflecting surface 71, by which the diffracted light is reflected. The light, after repeated diffraction by the reflection hologram 65 and repeated reflection by the reflecting surface 71, similar to the foregoing embodiments, is emitted from the hologram module through the non-hologram portion 65b.

In the arrangement shown in FIGS. 25A and 25B, the light is incident upon the incident portion 71a at a predetermined angle, similar to, for example, FIG. 21.

The hologram module shown in FIGS. 25A and 25B is functionally almost equivalent to the aforementioned embodiments. The reflection and diffraction angle increases as the angle P defined by the reflecting surface 71 and the reflection hologram 65 increases.

Note that the spatial frequency f of the hologram is given by the following equation.

$$2 \sin p = f\lambda/n$$

wherein n is the diffraction index of the optical medium 63 and $\lambda$ is the wavelength of the beams.

When P=45°, the tracks of the light are almost identical to those of FIG. 18. If the incident portion upon which the light from the tunable laser 13 is incident and the outgoing portion from which the light is finally emitted from the hologram module are provided on the side face including the reflecting surface 71, similar to FIGS. 15 to 17, and when N=10, an about 22.7° of variation $\Delta\theta$ of the angle is obtained by the variation $\Delta\lambda$ of the wavelength of the beam by +5 nm.

Numeral 103' designates one example of the light which is finally emitted from the hologram module when the wavelength of the incident beam is changed.

Figure 26:
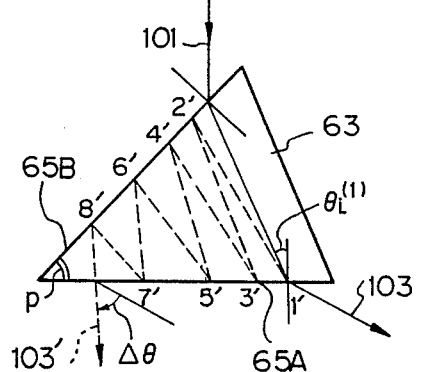
FIG. 26 is a schematic plan view of a hologram module different from that of FIGS. 25A and 25B.

In FIG. 26, two reflection holograms 65A and 65B are provided on the adjacent side faces of the glass body 63. Namely, the reflecting surface 71 in FIG. 25A is replaced with the additional reflection hologram 65B in FIG. 26. In the hologram module shown in FIG. 26, the light 101 from the tunable laser 13 is incident upon the incident portion (non-hologram portion) which corresponds to the incident portion 71a, for example, in FIG. 21, and which is provided on one of the side faces including the reflection hologram 65B or reflection hologram 65A, at a predetermined incident angle. In this embodiment, the incident light is repeatedly diffracted and reflected between the two reflection holograms 65A and 65B.

In FIG. 26, the light 103 and 103' is emitted from a non-hologram portion which corresponds to the non-hologram portion 65b shown in FIG. 25B and which is provided on the side face including the reflection hologram 65A, similar to the aforementioned embodiments.

In FIG. 26, when the angle P defined by the two reflection holograms 65A and 65B is 90° (P=90°), a variation $\Delta\theta$ similar to that in FIG. 18 can be expected.

Figure 27:
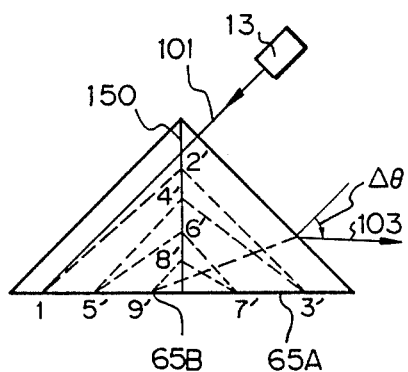
FIG. 27 is a schematic plan view of another hologram module different from that of FIGS. 25A and 25B; and, FIG. 28 is a schematic view showing one example of how to copy a master hologram.

In a modification illustrated in FIG. 27, a transmission hologram 150 and reflection holograms 65A and 65B are provided. The transmission hologram 150 is located between the opposite side faces of two identical glass bodies having a right angle triangle cross section. The reflection holograms 65A and 65B are aligned perpendicularly to the transmission hologram 150. In this embodiment, the incident portion (non-hologram portion) upon which the light 101 from the tunable laser 13 is incident and the outgoing portion (non-hologram portion) from which the light 103 is finally emitted are both provided on the transmission hologram 150. In this embodiment, the light can be scanned in accordance with the change in wavelength of the incident beam, similar to the aforementioned embodiments.

In FIGS. 25A, 26 and 27, numerals having a prime, such as 1', 2', etc., designate the order of the diffraction and reflection of the incident light in the hologram module.

When plane gratings of, for example, $f=2740/mm^2$, at an equal pitch of the hologram are formed to realize the hologram module of the invention, it should be borne in mind that they may have different incident angles at the incident points. For example, referring to FIG. 25A, 26 or 27, it can be easily understood that the light is incident upon the points 1, 2', 3', 4', etc., of the hologram 65, 65A, 65B, or 150. From this view point, it is preferably necessary to form a hologram having constant pitch gratings in which the light can be always incident upon any grating (points) at a Bragg angle. Such a hologram having constant pitch gratings and different Bragg angles can be produced in the process as disclosed, for example, in Japanese Unexamined Patent Publication (Kokai) No. 58-158678 corresponding to U.S. application Ser. No. 467,773 now abandoned.

Figure 28:
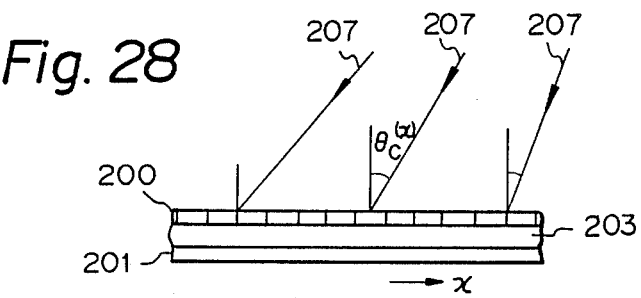

FIG. 28 shows an example of how to produce a hologram used in the present invention, in which a master hologram with $2740/mm^2$ of equi-pitch gratings is first formed by interference exposure process of two groups of coherent light (plane waves at 41.9° and $-41.9°$). Then, a copy hologram plate 201 with a photosensitive layer on which a copy hologram is to be formed is located below tee master hologram 200 through an index matching liquid (e.g. xylene or ethyl alcohol, etc.) 203. When the master hologram is copied on the photosensitive layer of the cop hologram plate to form a copy hologram, the copying light 207 is incident upon the master hologram 200 at different incident angles $\theta_c(x)$, which are properly selected to be optimum, depending on the position x of the master hologram 200. Such light having different incident angles can be easily created, for example, by a cylindrical lens or the like.

The angle P in FIGS. 15, 25A, and 26 is less than 180°, and preferably less than 90°.

We claim:

1. A holographic deflection device comprising at least one tunable laser, and at least one diffraction hologram for deflecting light incident thereupon from the tunable laser, so that the deflection of the light can be controlled by a change of the wavelength of the light by the tunable laser, said at least one diffraction hologram being arranged so that the variation of angle of deflection by the at least one diffraction hologram due to the change in wavelength are integrated by a plurality of successive diffractions.

2. A holographic deflection device according to claim 1, wherein said at least one diffraction hologram is a plurality of diffraction holograms located in an angular arrangement.

3. A holographic deflection device according to claim 2, wherein said plurality of diffraction holograms are provided with an optical medium therebetween.

4. A holographic deflection device according to claim 3, wherein said optical medium is air.

5. A holographic deflection device according to claim 2, wherein said plurality of diffraction holograms include at least one transmission hologram.

6. A holographic deflection device according to claim 2, wherein said plurality of diffraction holograms comprise a hologram lens for converging light upon a point.

7. A holographic deflection device according to claim 2, wherein said plurality of diffraction holograms comprise at least one reflection hologram.

8. A holographic deflection device according to claim 2, wherein said plurality of diffraction holograms comprise at least one transmission hologram and at least one reflection hologram in combination.

9. A holographic deflection device according to claim 2, wherein said plurality of diffraction holograms comprise at least one transmission hologram and/or at least one reflection hologram, and a reflecting surface means in combination.

10. A holographic deflection device according to claim 1, comprising a hologram module in which said diffraction holograms are provided.

11. A holographic deflection device according to claim 1, wherein said at least one diffraction hologram has plane gratings.

12. A holographic deflection device according to claim 1, wherein light is incident upon said at least one diffraction hologram at a predetermined incident angle.

13. A holographic deflection device according to claim 1, comprising a plurality of tunable lasers.

14. A holographic deflection device according to claim 1, wherein the light emitted from said at least one diffraction hologram is scanned.

15. A holographic deflection device according to claim 14, wherein the wavelength of the light is controlled in accordance with time so as to scan the light at a constant speed.

16. A holographic deflection device comprising at least one tunable laser, and a plurality of diffraction holograms for deflecting light incident thereupon from the tunable laser, so that the deflection of the light can be controlled by a change of the wavelength of the light by the tunable laser, said diffraction holograms being arranged so that the variation of angle of deflection by the holograms due to the change in wavelength are integrated by a plurality of diffractions, the diffraction holograms being located in an angular arrangement, and being provided with an optical medium therebetween, said optical medium being glass.

17. A holographic deflection device comprising at least one tunable laser, a plurality of diffraction holograms for deflecting light incident thereupon from the tunable laser, so that the deflection of the light can be controlled by a change of the wavelength of the light by the tunable laser, said diffraction holograms being arranged so that the variation of angle of deflection by the holograms due to the change in wavelength are integrated by a plurality of diffractions, and a hologram module in which said diffraction holograms are provided, said hologram module comprising a transparent optical body in which said diffraction holograms are provided.

18. A holographic deflection device according to claim 17, wherein said transparent optical body has a polygonal cross section.

19. A holographic deflection device according to claim 17, wherein said transparent optical body is made of a polygonal glass body.

20. A holographic deflection device comprising at least one tunable laser, a plurality of diffraction holograms for deflecting light incident thereupon from the tunable laser, so that the deflection of the light can be controlled by a change of the wavelength of the light by the unable laser, said plurality of diffraction holograms being arranged so that the variation of angle of deflection by the plurality of diffraction holograms due to the change in wavelength is increased by a plurality of successive diffractions, and a hologram module in which said diffraction holograms are provided, wherein said diffraction holograms are radially arranged in the polygonal transparent body with respect to the center axis of the polygon.

21. A holographic deflection device according to claim 20, wherein said polygonal transparent body has a square cross section and wherein said diffraction holograms are arranged along the diagonals thereof.

22. A holographic deflection device according to claim 21, wherein said square transparent body is made of four identical rectangular prisms, said diffraction hologram being formed on one side face of each rectangular prism.

23. A holographic deflection device according to claim 21, wherein said square transparent body is made of four rectangular prisms, two opposed rectangular prisms of which have said diffraction holograms on adjacent side faces thereof, and wherein said square transparent body has a beam incident portion upon which the light is incident to the transparent body toward the diffraction holograms and a beam emitting portion through which the outgoing light is finally emitted from the transparent body.

24. A holographic deflection device according to claim 23, wherein said beam incident portion and the beam emitting portion are formed on the side faces of the rectangular prisms on which said diffraction holograms are formed.

25. A holographic deflection device comprising:
at least one tunable laser;
at least one diffraction hologram for deflecting light incident thereupon from the tunable laser, so that the deflection of the light can be controlled by a change of the wavelength of the light by the tunable laser; and
a hologram module which has a rectangular transparent optical body, in which the diffraction hologram is provided, wherein said diffraction hologram is located along a diagonal of the rectangle, and wherein said rectangular transparent optical body has, on adjacent side faces thereof, reflecting surfaces which reflect the light diffracted by the hologram inward toward the hologram, and wherein said transparent optical body has a beam incident portion upon which the light from the tunable laser is incident to the transparent body on one side face thereof and a beam emitting portion through which the outgoing light is finally emitted therefrom on one side face of the transparent body.

26. A holographic deflection device according to claim 25, wherein said beam incident portion and beam emitting portion are formed on the same side face of the transparent body as that on which one of the reflecting surfaces is formed.

27. A holographic deflection device according to claim 25, wherein said beam incident portion and beam emitting portion are formed on the side faces of the transparent body on which the reflecting surfaces are formed.

28. A holographic deflection device according to claim 25, wherein one of said reflecting surfaces is inclined at a predetermined inclination angle with respect to a vertical side face of the rectangular body which is perpendicular to another of said reflecting surfaces.

29. A holographic deflection device according to claim 28, wherein light is incident upon the incident portion perpendicularly thereto.

30. A holographic deflection device according to claim 29, wherein said diffraction hologram has inclined diffraction gratings.

31. A holographic deflection device comprising at least one tunable laser, and at least one diffraction hologram for deflecting light incident thereupon from the tunable laser, so that the deflection of the light can be controlled by a change of the wavelength of the light by the tunable laser, and a polygonal transparent optical body which has said at least one diffraction hologram and a reflecting surface on adjacent side faces of the polygonal transparent body.

32. A holographic deflection device according to claim 31, wherein said diffraction hologram is a reflection diffraction hologram.

33. A holographic deflection device according to claim 32, wherein said reflection surface is formed by a reflection diffraction hologram.

34. A holographic deflection device according to claim 31, comprising reflection diffraction holograms and a transmission diffraction hologram in combination.

35. A holographic deflection device comprising at least one tunable laser, and at least one diffraction hologram for deflecting light incident thereupon from the tunable laser, so that the deflection of the light can be controlled by a change of the wavelength of the light by the tunable laser, said at least one diffraction hologram being arranged so that the variation of angle of deflection by the at least one diffraction hologram due to the change in wavelength are increased by a plurality of successive diffractions, and a polygonal transparent optical body which has said at least one diffraction hologram and a reflecting surface on adjacent side faces of the polygonal transparent body, wherein said adjacent side faces form a predetermined angle therebetween of less than 90°.

36. A holographic deflection device comprising at least one tunable laser, and at least one diffraction hologram for deflecting light incident thereupon from the tunable laser, so that the deflection of the light can be controlled by a change of the wavelength of the light by the tunable laser, a polygonal transparent optical body which has said at least one diffraction hologram and a reflecting surface on adjacent side faces of the polygonal transparent body, and reflection diffraction holograms and a transmission diffraction hologram in combination, wherein said transparent optical body is made of two identical triangular bodies which are joined together to form a triangle in cross section, and wherein said reflection diffraction holograms are aligned on one side face of the triangle, said transmission diffraction hologram being located along the structure of the two triangular bodies.

37. A holographic deflection device comprising at least tunable laser, and at least one diffraction hologram for deflecting light incident thereupon from the tunable laser, so that the deflection of the light can be controlled by a change of the wavelength of the light by the tunable laser, and said at least one diffraction hologram has equi-pitch plane gratings having different Bragg angles.

* * * * *

UNITED STATES PATENT AND TRADEMARK OFFICE
CERTIFICATE OF CORRECTION

PATENT NO. : 4,938,550

DATED : July 3, 1990

INVENTOR(S) : Takefumi Inagaki et al.

It is certified that error appears in the above-identified patent and that said Letters Patent is hereby corrected as shown below:

Col. 2, line 57, change "and," to --and--.

Col. 7, first equation, change "66" to --$\Delta$--, and change "74" to --$\theta$--;
second equation, change "$\approx$" to --$\dot{=}$--.

Col. 9, first equation, change "$\approx$" to --$\dot{=}$--.

Col. 11, line 5, change "th" to --the--.

Signed and Sealed this

Tenth Day of September, 1991

Attest:

HARRY F. MANBECK, JR.

*Attesting Officer*    *Commissioner of Patents and Trademarks*